(12) United States Patent
Zhang et al.

(10) Patent No.: US 9,773,343 B2
(45) Date of Patent: Sep. 26, 2017

(54) METHOD FOR REAL-TIME AND REALISTIC RENDERING OF COMPLEX SCENES ON INTERNET

(75) Inventors: Xiaopeng Zhang, Beijing (CN); Guanbo Bao, Beijing (CN); Hongjun Li, Beijing (CN); Weiliang Meng, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 1130 days.

(21) Appl. No.: 13/884,923

(22) PCT Filed: Dec. 24, 2010

(86) PCT No.: PCT/CN2010/002162
§ 371 (c)(1),
(2), (4) Date: Jul. 19, 2013

(87) PCT Pub. No.: WO2012/083508
PCT Pub. Date: Jun. 28, 2012

(65) Prior Publication Data
US 2015/0035830 A1   Feb. 5, 2015

(51) Int. Cl.
*G06T 15/60* (2006.01)
*G06T 15/04* (2011.01)
(Continued)

(52) U.S. Cl.
CPC .............. *G06T 15/60* (2013.01); *G06T 15/04* (2013.01); *G06T 15/10* (2013.01); *G06T 15/503* (2013.01);
(Continued)

(58) Field of Classification Search
CPC .............................. G06T 13/20; G06T 15/506
See application file for complete search history.

(56) References Cited

U.S. PATENT DOCUMENTS 5,870,097 A * 2/1999 Snyder .................. G06T 11/001
                                                                345/422
6,252,608 B1 * 6/2001 Snyder .................. G06T 11/001
                                                                345/422
(Continued)

FOREIGN PATENT DOCUMENTS

CN         1564203 A        1/2005
CN         1851753 A       10/2006
(Continued)

OTHER PUBLICATIONS

ISA/CN (State Intellectual Property Office), P.R. China; International Search Report; dated Oct. 13, 2011; Beijing, China.
(Continued)

*Primary Examiner* — Thomas Lett
(74) *Attorney, Agent, or Firm* — Davis Wright Tremaine LLP; Michael J. Donohue (57) ABSTRACT

A method for realistic and real-time rendering of complex scene in internet environment, comprising: generating sequences of scene-object-multi-resolution models, a scene configuration file, textures and material files, and a scene data list file; compressing the sequences of scene-object-multi-resolution models, the scene configuration file, the textures and material files, and the scene data list file and uploading the compressed files to a server; downloading, at a client terminal, the scene-object-multi-resolution models, the scene configuration file, the texture and material file, and the scene data list file in ascending order of resolution and rendering the scene simultaneously; dividing, in rendering the scene, a frustum in parallel into a plurality of partitions, generating a shadow map for each frustum, filtering the shadow maps to obtain an anti-aliasing shadowing effect; and the shadow map closest to a viewpoint is updated on a frame-by-frame basis and updating frequency decreases for the shadow maps distant from the viewpoint, wherein the (Continued)

shadow map closest to the viewpoint has the largest size, and the size of the shadow map decreases for the shadow maps distant from the viewpoint.

18 Claims, 10 Drawing Sheets

(51) Int. Cl.
  *G06T 15/10* (2011.01)
  *G06T 15/50* (2011.01)
  *G06T 19/20* (2011.01)
(52) U.S. Cl.
  CPC .......... *G06T 19/20* (2013.01); *G06T 2200/12* (2013.01); *G06T 2200/16* (2013.01); *G06T 2210/36* (2013.01); *G06T 2215/12* (2013.01)

(56) References Cited

U.S. PATENT DOCUMENTS

| | | | |
|---|---|---|---|
| 6,628,298 B1* | 9/2003 | Debevec | G06T 15/506 345/632 |
| 6,791,562 B2* | 9/2004 | Cosman | G06T 15/503 345/582 |
| 7,042,454 B1 | 5/2006 | Seligman | |
| 7,385,608 B1* | 6/2008 | Baldwin | G06T 1/20 345/419 |
| 7,593,010 B2* | 9/2009 | Wang | G06T 15/506 345/421 |
| 8,988,461 B1* | 3/2015 | Schmid | G06T 11/001 345/426 |
| 9,142,056 B1* | 9/2015 | Baran | G06T 15/00 |
| 2010/0013965 A1* | 1/2010 | Pugh, Jr. | G06K 9/2036 348/254 |
| 2012/0237083 A1* | 9/2012 | Lange | G06K 9/00805 382/103 |

FOREIGN PATENT DOCUMENTS

| | | |
|---|---|---|
| CN | 1904944 A | 1/2007 |
| CN | 101136108 A | 3/2008 |
| CN | 101216954 A | 7/2008 |
| CN | 101527050 A | 9/2009 |
| WO | 2005055150 A1 | 6/2005 |
| WO | 2008011050 A2 | 1/2008 |

OTHER PUBLICATIONS

Decoret, X., Durand, F., Sillion, F. X., and Dorsey, J. 2003. Billboard clouds for extreme model simplification. ACM Trans. Graph. 22, 3, 689-696 [doi>10.1145/882262.882326].

Fuhrmann A., Umlauf, E., Mantler, S.: Extreme model simplification for forest rendering. In Eurographics Workshop on Natural Phenomena 2005; 57-66.

Behrendt, S., C. Colditz, O. Franzke, J. Kopf, and O. Deussen. 2005. Realistic real-time rendering of landscapes using billboard clouds. Computer Graphics Forum. 24, 3, 507-516. [doi>10.1111/j.1467-8659].

Guanbo Bao, Xiaopeng Zhang, Wujun Che, Jaeger, M. 2009. Billboards for tree simplification and real-time forest rendering. PMA '09 Proceedings of the 2009 Plant Growth Modeling, Simulation, Visualization, and Applications, 433-440.

Decaudin, P. and Neyret,F. Rendering forest scenes in real-time. 2004. In Proc. of the 2004 Eurographics Workshop on Rendering, 93-102.

Decaudin, P. and Neyret,F. 2009. Volumetric billboards. Computer Graphics Forum, 28, 8, 2079-2089.

Qingqiong Deng, Xiaopeng Zhang, Gang Yang, Marc Jaeger. 2010, Multiresolution foliage for forest rendering, Journal Computer Animation and Virtual World, 21, 1, 1-23.

Fan Zhang , Hanqiu Sun , Leilei Xu , Lee Kit Lun, Parallel-split shadow maps for large-scale virtual environments, Proceedings of the 2006 ACM ternational conference on Virtual reality continuum and its applications, Jun. 14-Apr. 17, 2006, Hong Kong, China.

* cited by examiner

METHOD FOR REAL-TIME AND REALISTIC RENDERING OF COMPLEX SCENES ON INTERNET

TECHNICAL FIELD

The present invention relates to computer graphics, and particularly to a method for real-time and realistic rendering of complex scenes on the internet.

BACKGROUND

Real-time rendering of large-scale 3D scenes is important in computer graphics and virtual reality technology. One major challenge is that the large-scale scene may have high geometric complexities. Natural scenes in real-life contain various objects with rich geometric details and complex shapes. A typical complex scene is the plant model. The plant model has a very complex structure, which bring great difficulties in real-time and realistic rendering of the scenes. For example, assuming that a forest scene comprises 15,000 tree models, each of which comprising about 50,000 polygons in average, the scene will comprises a total number of 750 million polygons. It is very difficult to render a scene with such high geometric complexities in real-time while maintaining a certain degree of reality.

"Billboards" method is a common method in rending complex models. It is an Image-based rendering (TBR) method. It represents a model with a semi-transparent texture image oriented toward a view point or a plurality of intersecting texture images, so as to simplify the model. For the plant model, this method is very effective for the model distant from the view point because a projection of a leaf of the distant plant on a screen usually has a size less than a pixel. Due to the simple geometric structure of the plant represented by the Billboards method, this method has a very fast rendering speed. However, this method has an inferior effect of binocular parallax and may generate errors for bird's eye-view scenes. Decoret et al. proposed a "Billboard Clouds" method in 2003 (Decoret, X., Durand, F., Sillion, F. X., and Dorsey, J. 2003. Billboard Clouds for Extreme Model Simplification. ACM Trans. Graph. 22, 3, 689-696). This method simplifies any mesh model using billboard clouds. According to this method, geometric information of the model is projected into another space. An optimal set of billboards are found in the other space using Greedy algorithm to represent an input object with minimum errors. This set of billboards may have arbitrary orientations and positions, which is advantageous over conventional billboards. However, rendering plants using this method directly generally does not achieve idealistic effects. This method has been improved for simplification of plant models with more complex geometric structures. Fuhrmann et al. proposed an improvement of the method proposed by Decoret et al. (Fuhrmann A., Umlauf, E., Mantler, S.: Extreme Model Simplification for Forest Render, in Eurographics Workshop on Natural Phenomena 2005, 57-66). This method generally determines a series of sample view points in preprocessing. In the direction of each view point, the plant is rendered and rendering results are saved as texture images. In real-time rendering, for a current view point, nearest-neighbor sample view points are found according to information of the current sample view point. Then texture images corresponding to these sample view points are interpolated to generate rendering results for the current view point. Behrendt et al. proposed in 2005 a better approximation method by improving the Billboard Clouds method with reference to plant topology using heuristic clustering. (Behrendt, S., C. Colditz, O. Franzke, J. Kopf, and O. Deussen. 2005. Realistic Real-Time Rendering of Landscapes Using Billboard Clouds. Computer Graphics Forum. 24, 3, 507-516). The Billboards method can substantially reduce the geometric complexity of the plant model. However, it is difficult to maintain the appearance of the plant. The geometry is presented based on images, so that it is usually different to obtain satisfying effect of model rendering.

Later on, a method has been proposed by simplify the plant model by combining geometric mesh and Billboards, i.e., a combination of 2D and 3D methods. For example, Bao et al. simplify leaves of the plant using the Billboard Clouds method and maintain the geometric shape of the items to obtain better parallax than simply using the Billboards method. (Guanbo Bao, Xiaopeng Zhang, Wujun Che, Jaeger, M. 2009. Billboards for Tree Simplification and Real-Time Forest Rendering. PMA '09 Proceedings of the 2009 Plant Growth Modeling, Simulation, Visualization, and Applications, 433-440). However, the combination of 2D and 3D methods does not greatly improve the rendering effect. It is still difficult to calculate light illumination of the billboards obtained by simplifying the leaves. Decaudin et al. proposed an improved method for rendering the complex scenes in 2004 (Decaudin, P. and Neyret, F. Rendering Forest Scenes in Real-Time. 2004. In Proc. of the 2004 Eurographics Workshop on Rendering, 93-102) and in 2009 (Decaudin, P. and Neyret, F. 2009. Volumetric Billboards. Computer Graphics Forum, 28, 8, 2079-2089). In rendering the scene, the scene model is first rendered as 3D texcells and then the texcells are laid on geography non-periodically to rendering the scene. This method has a fast rendering speed and is suitable for plan-view observation such as in aircraft simulation. However, the observer cannot roam in the scene. Also, this method using the texcells consumes a large amount of memory resource of the computer. With development of computer hardware, people are putting higher requirement on the reality of the large-scale complex scene. However, neither the Billboards method nor the texcell method provides idealistic reality in rendering the scene. An object rendered using the Billboards method has a "thin-slice" appearance when it is viewed from a short distance. It lacks a 3D effect and the shadow effect is inferior. The light illumination in the texcell method is pre-calculated and thus dynamic illumination and shadow effect cannot be achieved when the scene is rendered. The rendered scene appears non-realistic due to excessive repetitiveness.

Deng et al. proposed a method of leaves simplification in GPU using pure 3D mesh model. (Qingqiong Deng, Xiaopeng Zhang, Gang Yang, Marc Jaeger. 2010, Multiresolution Foliage for Forest Rendering, Journal Computer Animation and Virtual World, 21, 1, 1-23). The plant model obtained by this simplification method is suitable for complex calculation of illumination shadow and its rendering effect is better than the above-mentioned methods. In view of this, the model sequence generated by this simplification method will be employed in the present invention.

Shadow is one of the most basic elements in nature world. Proper utilization of shadows may greatly enhance reality of the scene. However, the shadows of the large-scale scene often have obvious sawtooth effect. Zhang et al. proposed Parallel-Split Shadow Maps (PSSM) in 2006 (Fan Zhang, Hanqiu Sun, Leilei Xu, Lee Kit Lun, Parallel-Split Shadow Maps for Large-Scale Virtual Environments, Proceedings of the 2006 ACM international conference on Virtual reality continuum and its applications, June 14-Apr. 17, 2006, Hong Kong, China). According to this method, a frustum of a viewpoint is divided into a plurality of parallel partitions according to a predetermined rule. A shadow map is generated using depth textures of equal size for each part. In this way, the sample rate for the screen is the same as that for the shadow map, resulting in a good anti-aliasing effect. This method is widely used in generating shadows of the large-scale scene. However, this method cannot realize real-time realistic rendering of the large-scale complex scene because it is not combined with model simplification.

SUMMARY

An object of the present invention is to provide a method for real-time and realistic rendering of complex scenes on the internet.

Therefore, method for real-time and realistic rendering of complex scenes on the internet, comprising:

a) generating sequences of scene-object-multi-resolution models, a scene configuration file, textures and material files, and a scene data list file;

b) compressing the sequences of scene-object-multi-resolution models, the scene configuration file, the textures and material files, and the scene data list file and uploading the compressed files to a server;

c) downloading, at a client terminal, the scene-object-multi-resolution models, the scene configuration file, the textures and material files, and the scene data list file in ascending order of resolution and rendering the scene simultaneously;

d) dividing, in rendering the scene, a frustum in parallel into a plurality of partitions, generating a shadow map for each frustum, filtering the shadow maps to obtain an anti-aliasing shadowing effect; and e) the shadow map closest to a viewpoint is updated on a frame-by-frame basis and updating frequency decreases for the shadow maps distant from the viewpoint, wherein the shadow map closest to the viewpoint has the largest size, and the size of the shadow map decreases for the shadow maps distant from the viewpoint.

The present employs technologies such as the multi-resolution 3D geometric model sequence, multi-resolution shadow texture, frustum cropping, real-time shadow technology, progressive transmission of 3D model based on web, multi-thread control, and multi-resolution organization of model and shadow. The present invention enables fast roaming in the large-scale 3D scene without sacrificing reality.

BRIEF DESCRIPTION OF DRAWINGS

FIG. 5(a) to FIG. 5(e) show models with resolutions from high to low, respectively.

FIG. 6 illustrates a downloading interface showing a URL and a transfer progress. In this figure, seventeen files have been downloaded, wherein each tree is represented by five models with different resolutions. The downloaded files constitute 37.5% of the total files that need to be downloaded. The user needs to designate a memory location to store the downloaded scene files and all the multi-resolution model files.

FIG. 8(a) illustrates a rendering effect achieved by employing the lowest-resolution models where all the trees are represented by the lowest-resolution models containing 424662 triangles in total. FIG. 8(b) illustrates a rendering effect achieved by employing the lowest-resolution models and the secondary-lowest-resolution models where a major part of the trees (464 trees) are represented by the lowest-resolution models and a minor part of the trees (141 trees) are represented by the secondary-lowest-resolution models. FIG. 8(b) contains 754042 triangles in total. FIG. 8(c) illustrates a rendering effect achieved by employing models with four different resolutions, where 462 trees are represented by the lowest-resolution models, 76 trees are represented by the secondary-lowest-resolution models, 42 trees are represented by tertiary-lowest-resolution models, and 25 trees are represented by secondary-highest models. FIG. 8(c) contains 1249235 triangles in total.

FIG. 10(a) illustrates the shadowing effect before the anti-aliasing process. FIG. 10(b) illustrates a shadowing effect after the anti-aliasing processing using a 3*3 Gauss filter. FIG. 10(b) illustrates a shadowing effect after the anti-aliasing processing using a 5*5 Gauss filter.

FIG. 11(a) illustrates the effect in the early morning. FIG. 11(b) illustrates the effect when the sun has risen high.

EMBODIMENTS

The present invention will be explained in detail with reference to the drawings. It should be noted that the embodiments are only illustrated for easy understanding of the present invention rather than limit the scope thereof.

1. Overview of the Method

The present invention provides, among other things, real-time and realistic rendering of complex scenes on the internet, which comprises real-time calculation of dynamic shadowing of the complex scene and roaming in the complex scene. The present invention may relate to techniques such as simplification of 3D geometric models, sequential extraction of multi-resolution models, transition between multi-resolution model sequences of simplified 3D geometric models, frustum clipping, real-time shadowing, and data downloading based on the web. The real-time and realistic rendering of the complex scene can be applied in movie and game manufacture, virtual simulation, digital agroforestry, and urban landscape planning, etc.

A method according to the present invention may comprise five steps:

Step 1: Constructing complex scene data. 3D geometric models with high reality are obtained by various modeling methods. A sequence of multi-resolution models is generated for each 3D geometric model according to a predetermined rule. The sequence of the multi-resolution models is output as a file with a standard 3D data format. Scene configuration file and textures and material files are constructed. A downloading file is configured for each scene.

Step 2: Uploading data to a server. Each of the multi-resolution models, the scene configuration file, and the textures and material files is stored as in a binary format. These binary files are converted into the Zip format protected by a password. The zip file has a relatively small size suitable for subsequent transmission. These files and the downloading list are uploaded to the server.

Step 3: Downloading a specified list file after a scene rendering program is activated at a client terminal and then downloading the zip files corresponding to the scene configuration file, the multi-resolution models, and the geomorphic texture files according to the list file. The downloading process is performed in a progressive way. For example, in downloading the sequence of the multi-resolution models, models with a relatively low resolution are downloaded prior to the models with a relatively high resolution. The rendering and the downloading are performed in two threads and thus can be performed simultaneously. If the high-resolution models of the scene have not been downloaded, the lowest-resolution models can be used temporarily instead. The downloaded zip files are read into a memory and unzipped into the binary model files using the password. The binary files are read into the memory and the unzipped files are deleted for security consideration.

Step 4: Rendering the scene. The sequences of the multi-resolution models are organized into Vertex Buffer Objects (VBOs). The VBOs are input to a video memory for accelerating the rendering. Real-time shadowing is employed where a real-time dynamic shadowing effect is achieved by the GPU using OpenGL Shading Language (GLSL) based on Shadow mapping. A frustum is divided in parallel into a plurality of partitions. A shadow mapping is generated for each partition to achieve an anti-aliasing shadowing effect.

Step 5: Generating shadow maps (also called depth cache maps) for the shadows. The shadow maps close to the viewpoint are large in size and updated on a frame-by-frame basis. The shadow maps distant from the viewpoint are small in size and updating frequency thereof decreases accordingly. The shadow map in each frustum is generated by Multiple Render Targets simultaneously. In rendering, the shadowing effect can be achieved by comparing each element in a fragment shader with the shadow maps. Due to the slim branches of a plant model, the shadow may have obvious aliasing effect and uncontinuous branches. In view of this, Gauss filtering may be employed in the fragment shader for anti-aliasing process.

Figure 1:
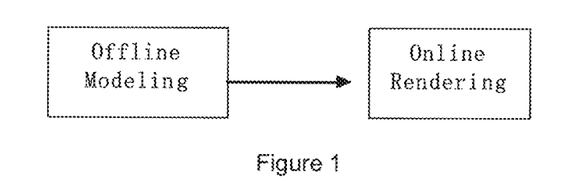
FIG. 1 illustrates an overall flow of a method according to the present invention, the method comprising off-line multi-resolution modeling and on-line realistic rendering.
Figure 2:
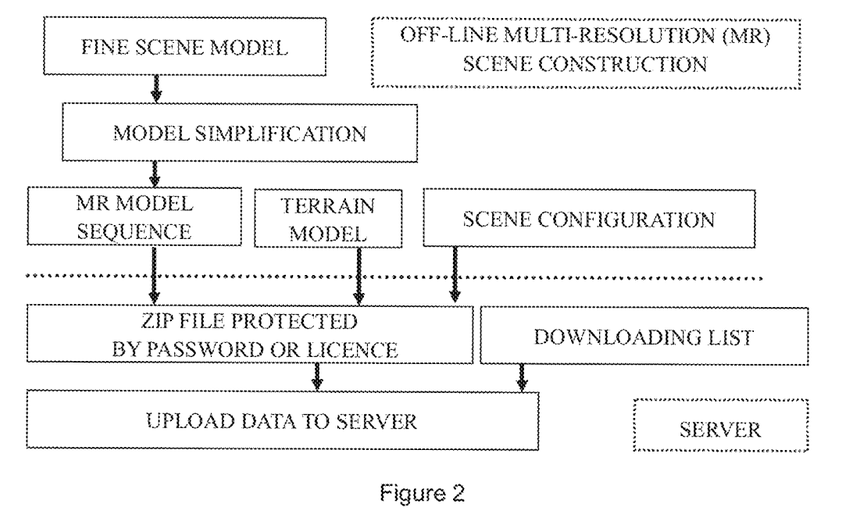
FIG. 2 illustrates the off-line multi-resolution modeling in the method according to the present invention as shown in FIG. 1, the off-line multi-resolution modeling comprising off-line multi-resolution scene construction and server-side storage, wherein: the off-line multi-resolution scene construction comprises: constructing precise scene model construction, model gradual simplification, MR model sequence (i.e., much model sequence) output, ground model construction, and scene configuration file construction; and the server-side storage comprises storing the file in Zip format and set a password or license, downloading a list, and uploading data to the server.
Figure 3:
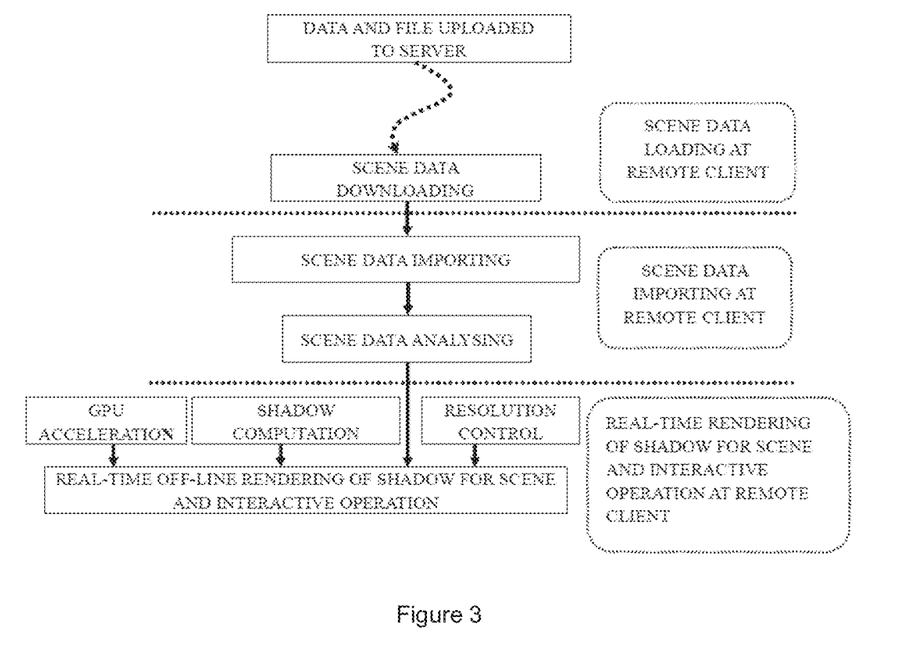
FIG. 3 illustrates the on-line realistic rendering in the method according to the present invention as shown in FIG. 1, the on-line realistic rendering comprising: remote-client scene data downloading, remote-client scene data importing, and remote-client scene real-time shadow rendering and interactive operation, wherein: the remote-client scene data downloading comprises downloading scene data and files uploaded to the server; the remote-client scene data importing comprises scene data importing and scene data analyzing; the remote-client scene real-time shadow rendering and interactive operation comprises: GPU acceleration, shadow calculation, resolution control, and off-line real-time rendering of scene shadow and interactive operation.
Figure 4:
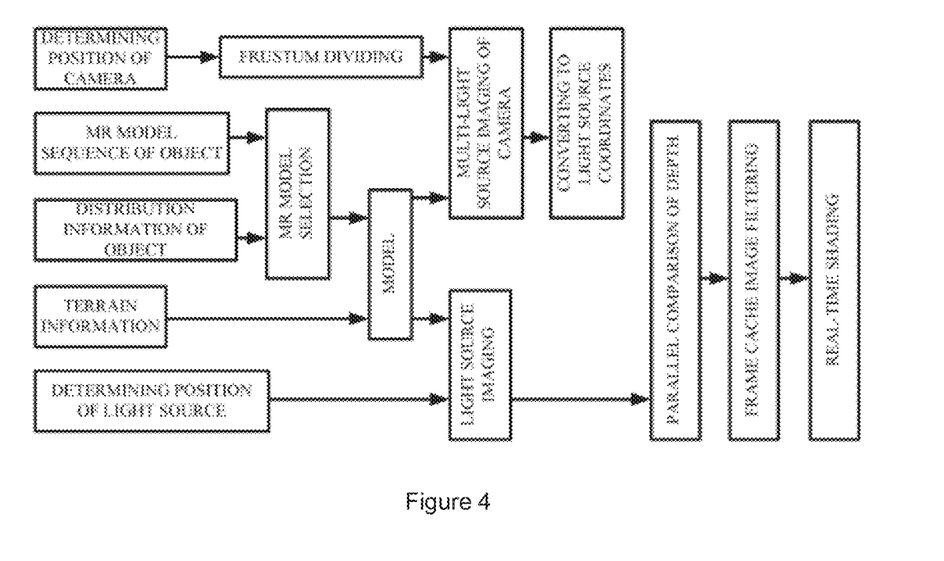
FIG. 4 illustrates an overall flow of the off-line real-time rendering of scene shadow and interactive operation according to the present invention as shown in FIG. 3, the off-line real-time rendering of scene shadow and interactive operation being implemented by a frustum imaging module, a scene model selection module, and a light source frustum imaging module. The off-line real-time rendering of scene shadow and interactive operation are performed off-line after the data is obtained on-line. In each rendered frame, the frustum image module first divides the frustum into a plurality of sub-frustum using Parallel-Split Shadow Mapping (PSSM) according to the position of the view point. The scene model selection module performs model cropping on each sub-frustum and determines a model to be rendered in each frustum. Then the model in each frustum is projected into a light source coordinate system. A shadow map is generated by the light source frustum imaging module for each sub-frustum. Then the frustum imaging module renders the scene. The frustum imaging module projects coordinates of each rasterized fragment into the light source coordinate system and compares the projected coordinates with corresponding coordinates in the shadow map of the sub-frustum corresponding to the fraction and performs anti-aliasing filter in the shadow map to generate a soft shadowing effect. In this way, the large-scale scene can be rendered in real time.

FIG. 1 illustrates an overall flow of the method. FIGS. 2 and 3 illustrate steps of two parts of FIG. 1. FIG. 4 illustrates real-time shadow rendering method of the scene and interactive operation thereof.

2. Construction of Complex Scene Data

There are many ways for modeling the scene, including but not limited to modeling based on image, modeling based on laser scanning point clouds, model based on hand-drawing pictures, modeling based on growth mechanism of plant, modeling based on curved line or surfaces, modeling based on human interactions using software, or combinations thereof. One of these modeling methods is used to generate 3D geometric models having high reality and the sequence of multi-resolution models are generated for each 3D geometric model taking consideration of requirement of rendering the scene and transmission over the network.

Traditional progressive simplification methods can be used to simplify the three-dimensional manifold models. However, these methods do not work for non-manifolds having complex topology and non-manifold geometric shapes. The method according to the present invention can be applied to non-manifold objects, especially the leave object of the tree. The complex object is replaced with a simple local geometric object defined by local spatial degree. This process is repeated until a simple representative model is generated. The spatial degree of a set of points $\psi$ defined as the volume of a tetrahedron defined by the following four points: the first and second points being two endpoints of the tetrahedron's diameter; the third point being a point in $\psi$ with a largest sum of distances to the first and second points; and the fourth point being a point in $\psi$ with a largest sum of distances to the first, second, and third points. The tetrahedron is obtained by connecting the first to fourth points in sequence. The present invention simplifies a geometric object comprising two polygons. For example, two tetrahedrons have 8 vertexes. Two triangles have 6 vertexes. A triangle and a tetrahedron have 7 vertexes. The geometric object is represented by a tetrahedron having a largest spatial degree. The progressive simplification method maintains consistency of the simplification of texture coordinates and the geometric information. The consistency of the texture coordinates means the consistency between a length direction of a texture image and a direction of a diameter of the set. For a leaf texture of a tree model, a complex mesh model of the leaf is replaced with a tetrahedron in progressive simplification. The texture coordinates are replaced with (0, 0), (1, 0), (1, 1) and (0, 1). The tetrahedron is subject to texture mapping using a right-hand coordinate system. A normal vector of the tetrahedron is used as an axis of the right-hand coordinate system. For further simplification, two adjacent tetrahedrons can be combined into a larger tetrahedron. The normal vector of the tetrahedron is calculated and the numbers of the vertexes and the texture coordinates are determined according to the right-hand rule.

After the multi-resolution models are generated, the lists of the multi-resolution models (MR model sequences) are constructed by selecting specific models. The model selection rule used by the present invention is the distance to the viewpoint based on the complexity of the model. The number of polygons is a linear function or nonlinear function (including the piecewise function) of distance from the viewpoint. For a piecewise function, the distance is divided into k+1 segment by dividing points $\{d_i\}_{i=1, 2, \ldots, k}$ ($0 \leq d_1 \leq d_2 \leq \ldots \leq d_k$). The k dividing points divide a non-negative space into (k+1) segments. The numbers of polygons in respective segments are noted as $\{n_i\}_{i=1, 2, \ldots, k+1}$ ($n_1 \geq n_2 \geq \ldots \geq n_k \geq n_{k+1} > 0$), where $n_1$ is the number of the finest model's polygons. $n_{i+1} = s \cdot n_i, 1 \leq i \leq k, 0 < s < 1$. s is a compression factor defined by a user to represent the simplification degree of the model.

Figure 5:
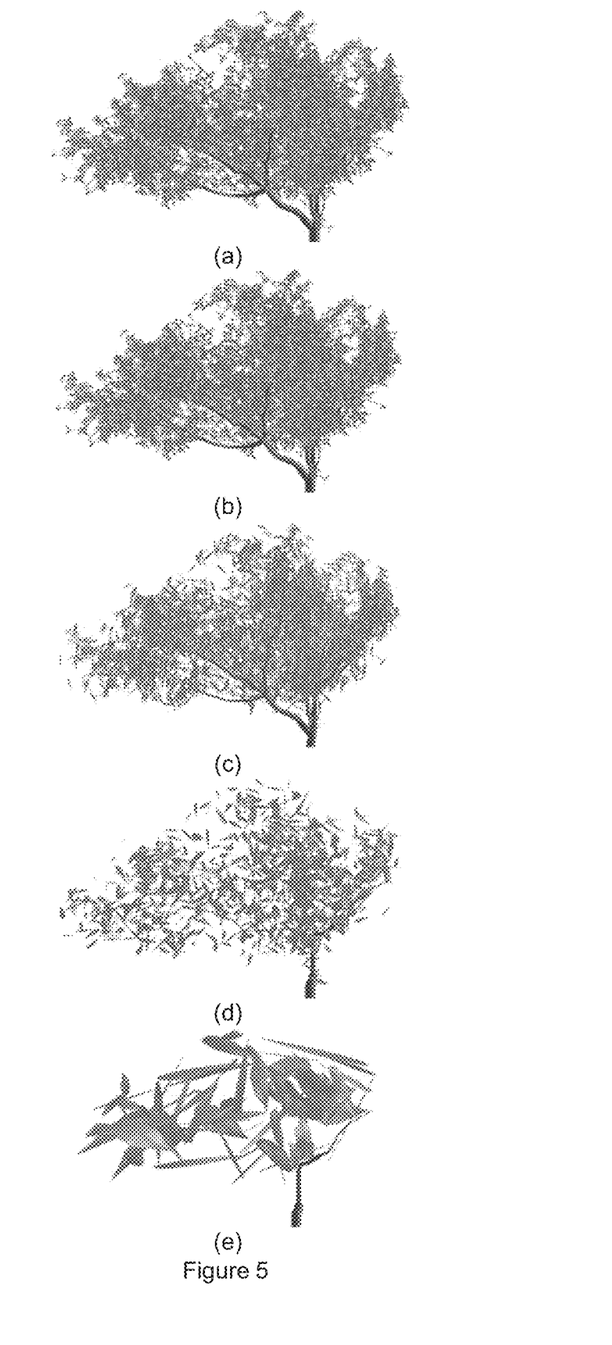
FIG. 5 illustrates a list of tree multi-resolution models arranged from bottom to top in accordance to generation order of the models. The list shown in FIG. 5 includes 5 models.

FIG. 5 illustrates a sequence of multi-resolution models of a tree. These models take into consideration texture information, and thus texture mapping can be applied to all the multi-resolution models. FIG. 5(a) illustrates a finest model of the tree suitable to be displayed when the tree is close to the view point. Braches of the tree have 15937 leaves each represented by a polygon. Then texture mapping is performed using four channels of text images. The branches have 214785 polygons. Bark mapping is also performed. FIG. 5(b) illuminates simplification of FIG. 5(a). In FIG. 5(b), the leaves have 15937 polygons and branches have 92682 polygons. The complexity of the model as shown in FIG. 5(b) is about 50.6% of the original model. FIG. 5(c) illustrates a simplification of the model as shown in FIG. 5(b). In FIG. 5(c), the leaves have 5688 polygons and the branches have 14968 polygons. The complexity of the model is about 9.7% of the original model. FIG. 5(d) illustrates a simplification of the model as shown in FIG. 5(c). In FIG. 5(d), the leaves have 1401 polygons and the branches have 644 polygons. The complexity of the model is about 0.74% of the original model. FIG. 5(e) illustrates a simplification of the model as shown in FIG. 5(b). In FIG. 5(e), the leaves have 86 polygons and the branches have 644 polygons. The complexity of the model is about 0.26% of the original model.

The resolution of each mode in the sequence of multi-resolution models (corresponding to the simplification degree of the complexity of the model) is defined as a ratio of the number of polygons in the current model to that in the finest model. This is determined by a segmented function, which is shown in below equation (2) for example:

$$\begin{cases} 100\%, 0 < d_{me} \leq 15 \\ 50.0\%, 15 < d_{me} \leq 50 \\ 10.0\%, 50 < d_{me} \leq 150 \\ 1.00\%, 150 < d_{me} \leq 300 \\ 0.25\%, 300 < d_{me} < +\infty \end{cases} \quad (1)$$

Where $d_{me}$ represents the distance from the model to the view point. The unit of the distance is meter.

Simplification of the polygons of the branches takes priority over simplification of the polygons of the leaves. The overall reality of the scene is more sensitive to the simplification of the leaves than to that of the branches in that the branches are sheltered by the leaves.

The generated sequence of multi-resolution models is exported as a file of standard 3D data format. The file comprises 3D coordinates of each vertex of the models, connections between respective vertexes (i.e., surface information), texture coordinates, texture file name, and material information. The coordinates of the vertexes, the normal vector, the texture coordinates and the surface information constitute a group. The material information is designated for each group. The vertexes' numbers are designated for each surface. The normal vector's number and/or the numbers of the texture coordinates are also designated. Each file comprises one or more groups. A material file is designated for each file.

The 3D data files are encoded as records of these files. The order for encoding the vertex information and surface information are related to the simplification procedure of the models. For example, the vertexes' coordinates are arranged in a reversed order with respect to the order in which the points are simplified in the progressive simplification procedure. Corresponding normal coordinates and texture coordinates are arranged according. The surfaces are arranged in accordance with the vertexes' order. A surface will be arranged before other surfaces if its vertexes are arranged before the vertexes of the other surfaces. In encoding, the surfaces and the vertexes are arranged together. The vertex information comprises coordinates, normal vector coordinates, and texture coordinates. The order of the vertexes depend on the order of the surfaces. The vertexes of each surface are arranged before the surface and as close to the surface as possible.

In addition to the model files, scene configuration file and texture and material files are also constructed. The scene configuration file describes the layout of each scene, comprising scaling, position, and rotation angle of each model. The texture and material file include material properties, such as ambient light, diffused light, reflected light, transparency, and texture image, of each group.

Furthermore, a geographic model is configured for each scene. The geographic model comprises an elevation map and a texture file. Alternatively, a geometric image can be used as the geographic model. When the geographic image is used as the geographic model, the elevation information is obtained by scaling luminance values of the image.

Finally, all of the above documents are listed in a text file as a download list. The scene configuration file, the geographic files, the textures and material files, and the sequences of multi-resolution models are listed in sequence. The sequence of multi-resolution models are listed in such an order that models having small size and low complexity are listed prior to those having large size and high complexity. This helps a user to download part of the scene data rapidly. The file directing the content and order for downloading is called a downloading list file.

3. Uploading of Data

Each multi-resolution model, scene configuration file, and texture and material file are converted into a binary format and then compressed into a zip package protected by a password. This reduces file size and ensures data security, facilitating subsequent transmission via network. These files and the downloading list file are uploaded to a server.

4. Downloading and Importing of Data

Figure 6:
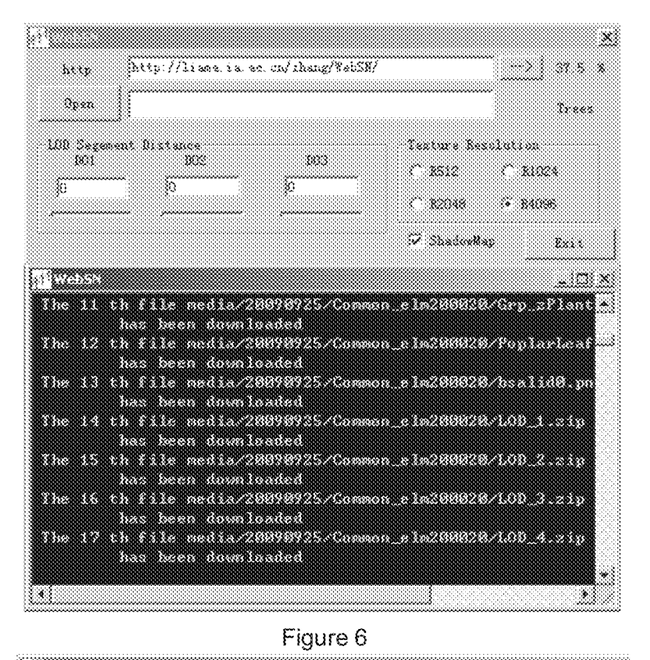

Data can be downloaded remotely via the network by a user data downloading module at a client terminal. Only the user of a specific client terminal can download the scene data because the client terminal should know the address of the data priori. The list file is downloaded first. Then the scene configuration file, the geographic file, and the sequences of multi-resolution models are downloaded in sequence in accordance with the list file. In downloading the sequences of the multi-resolution models, the models having a small volume of data and low complexity are downloaded before the models having a large volume of data and high complexity. FIG. 6 illustrates a downloading interface, the upper right portion of which shows the progress of downloading. The progress of downloading can also be seen at a console window in a bottom portion of FIG. 6.

The importing of data can be divided into two phases. In the first phase, the user at the client terminal specifies a scene file, which records all information of a scene to be rendered. The information may include, e.g., the name of the zip file correspond to the scene, the position of the scene, and the elevation and geographic texture of the scene, etc. In the second phase, the zip file is decompressed into a binary file. The binary file is read into a memory and then deleted for security consideration.

Figure 7:
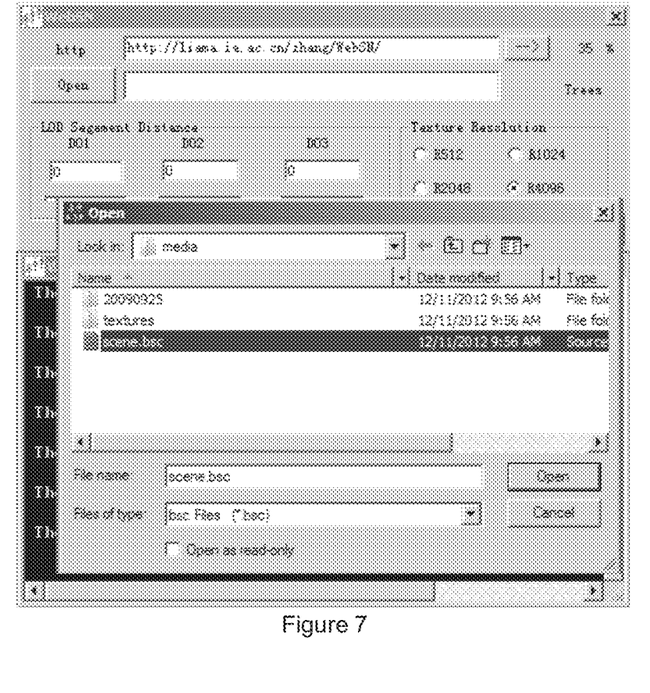
FIG. 7 illustrates an interface where the scene file is opened. The user needs to indicate the memory location where the scene file has been stored.

The downloading and importing of data can be performed in parallel, wherein the downloading of data is performed by a secondary thread. The scene is rendered while the data is downloading. Models that have not been downloaded can be replaced by simple ones so that the user at the client terminal can see a simplified scene. As more complex models are downloaded, the scene becomes increasingly clear and realistic. FIG. 7 shows, in addition to FIG. 6, a dialog box for opening files. It can be seen that data can be read into a program during the downloading of the data.

5. Rendering of Scene 5.1 Smooth Transition of Multi-Resolution Model Sequences

In order to achieve smooth transition between the sequences of multi-resolution models, models that are not in the frustum of the viewpoint are culled before the rendering to increase rendering speed.

In particular, a boundary box is calculated for each model. Coordinates of eight vertexes of the boundary box is calculated in a viewport coordinate system. If none of the projections of the eight vertexes in the viewpoint coordinate system is in the viewport, the model is culled and will not be rendered. However, this process will erroneously cull certain models very close to the viewpoint. The erroneously culled models may appear in the frustum abruptly with movement of the viewpoint, causing jolt in visual perception. In view of this, a limitation is provided that models very close to the viewpoint are always rendered. Although a few trees outside the frustum are rendered, the rendering speed is not affected substantially. The same applies to generation of shadow mapping. Then respective distances from the tree to the viewpoint are calculated and a corresponding multi-resolution model is selected according to a threshold defined by the user.

The rendering speed and effect may vary according to computer hardware and user's requirement. Sometimes the user may prefer fine rendering effect than real-time rendering speed, while sometimes the user may want real-time roaming in the scene and have fewer requirements on the rendering effect. As such, a control interface can be provided for the user to select a desirable model resolution. The user of the client terminal can control the distance ranges corresponding to the multi-resolution models via the interface to adjust the complexity of the scene. In this way, the user can achieve a satisfied effect. The principle of the control is shown in equation (2).

Figure 8:
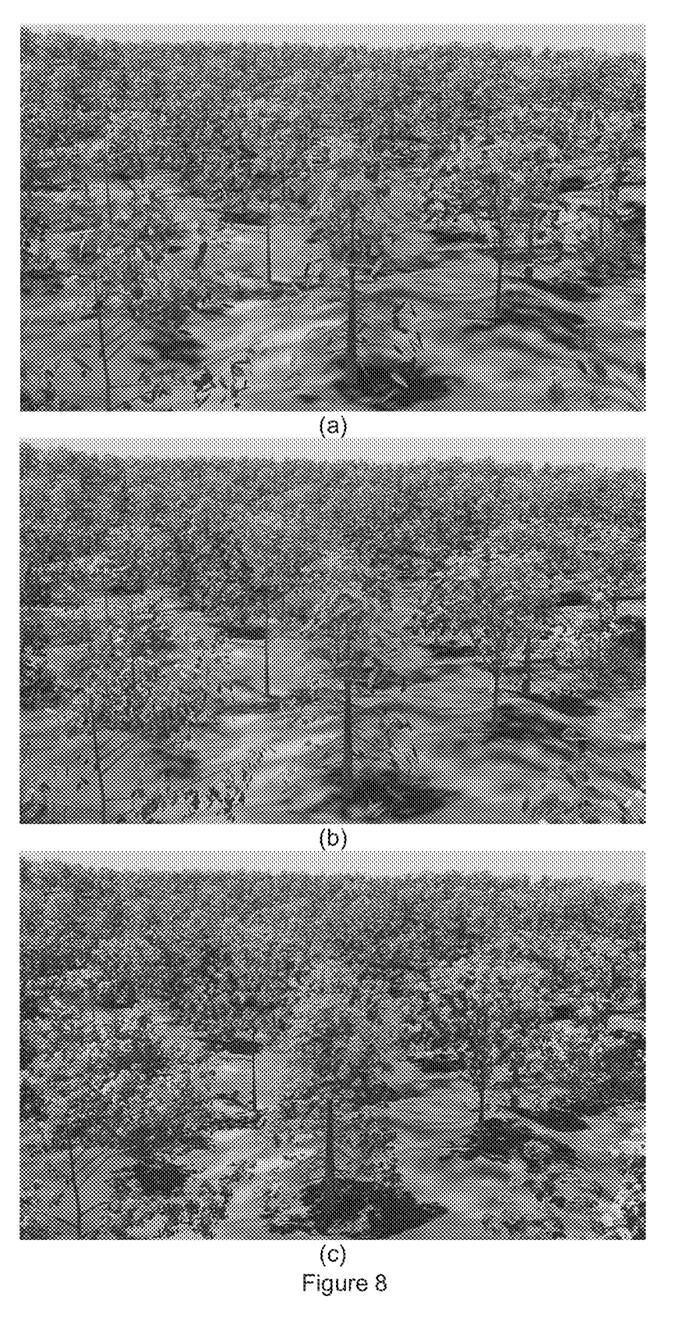
FIG. 8 illustrates a transition effect from low-resolution tree models to high-resolution tree models in rendering a forest scene. There are 605 trees being rendered.
Figure 9:
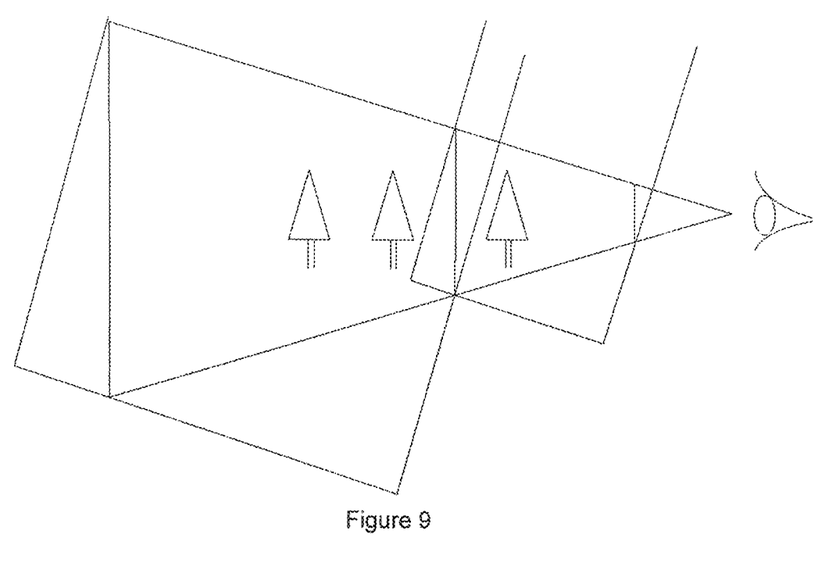
FIG. 9 illustrates division of a frustum according to the present invention.

FIG. 8 illustrates the effect of adjusting the scene complexity by controlling the distances corresponding to each multi-resolution model. FIG. 8(a) shows the scene rendering in default configuration. Trees within 11 meters from the viewpoint are rendered by models with the highest reality. The branches, leaves, and shadows all have a good rendering effect. Trees located in a range of 11 meters to 39 meters from the viewpoint are rendered by simplified models. Trees located in a range of 40 meters to 95 meters from the viewpoint are rendered by further simplified models. Trees located beyond 95 meters are rendered by even further simplified models. In this way, the scene is rendered in a fast speed. FIG. 8(b) shows a rendering effect when parameters are adjusted to adapt to a computer with a lower configuration or a slower downloading speed. In this case, some models close to the viewpoint are simplified models. FIG. 8(c) shows a rendering effect when parameters are adjusted to adapt to a computer with a even lower configuration or a even slower downloading speed. In this case, most models close to the viewpoint are simplified models. It can be seen from the figures that even though the simplified models are used for rendering, high reality can be achieved by the present invention. When fine models are downloaded to the computer, the reality can be further enhanced.

5. 2 Real-Time Shadow Rendering

The shadows are generated by shadow mapping. Each frame are rendered twice. In the first rendering of the frame, the current scene is rendered in a light source frustum (light source space) to obtain a current shadow map. Each pixel in the shadow map represents a depth value of the current position with respect to the light source. The second rendering is performed a frustum of viewpoint (space of viewpoint). Coordinates of each 3D fragment are projected by a fragment shader to the light source space. If the projected depth value is larger than that of the current point in the shadow map, the point is in the shadow.

The shadows obtained by a single shadow mapping may often have severe aliasing. Thus, anti-aliasing process is performed. The frustum of viewpoint is divided into a plurality of partitions and the shadow map in the frustum of light source is calculated for each partition, respectively.

Figure 10:
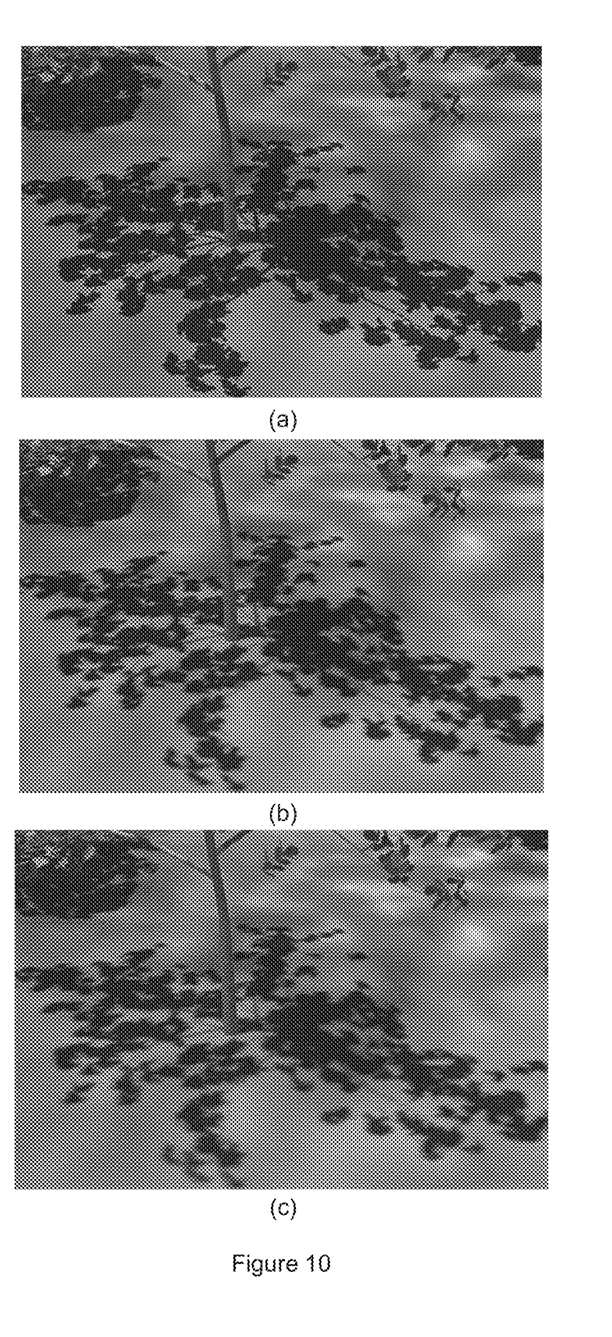
FIG. 10 illustrates a comparison between a shadowing effect before anti-aliasing process and a shadowing effect after anti-aliasing process according to the present invention.
Figure 11:
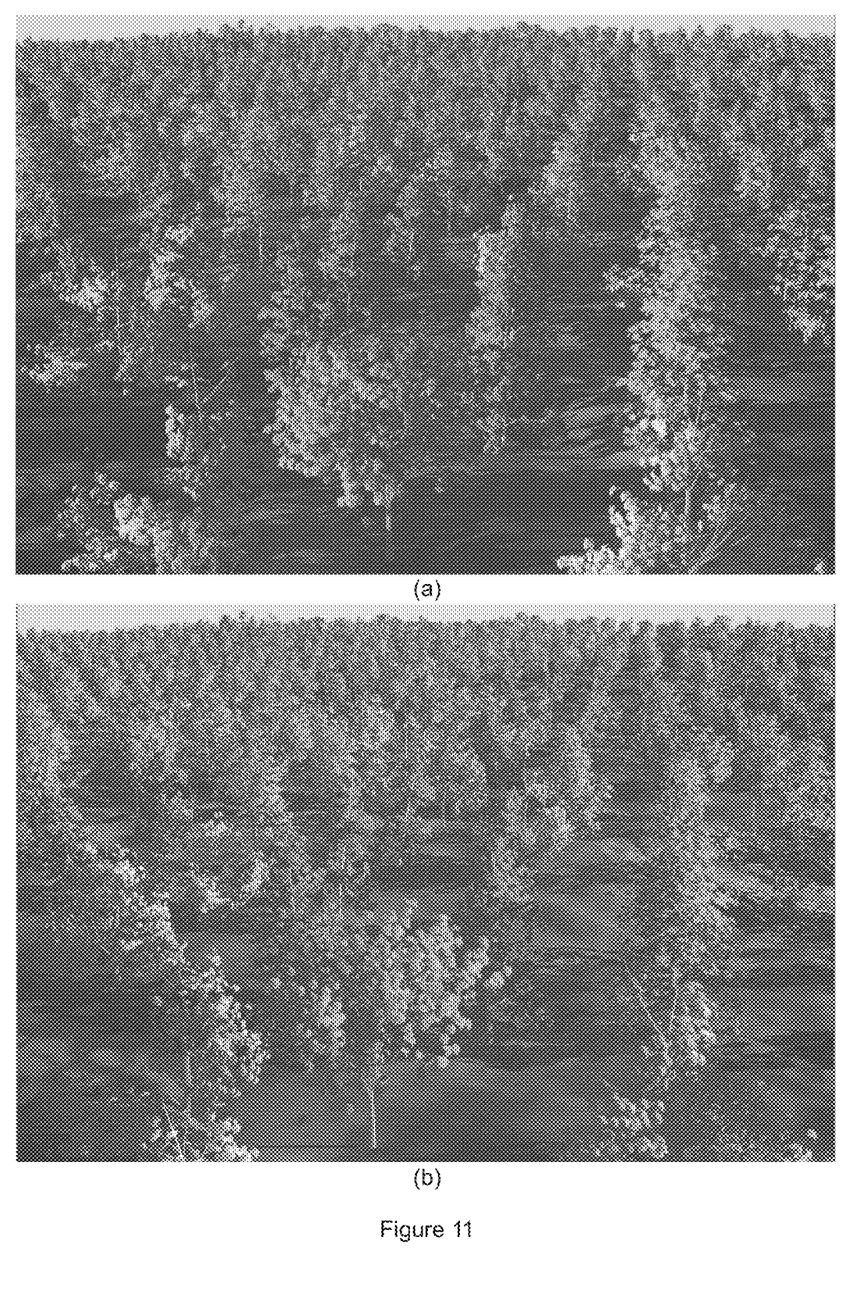
FIG. 11 illustrates real-time changing of a dynamic shadowing effect according to the present invention.

In the first rendering, for each frustum of the light source, models that are not in the current frustum of light source are culled. That is, only models in the current frustum of light source are rendered. In this way, even though the frustum of viewpoint is divided, the geometric complexity for the first rendering does not change substantially. That is, the total number of models to be rendered for generating the plurality of shadow maps after dividing the frustum is substantially the same as that when the frustum is not divided. In the second rendering, the fragment shader first determines to which frustum a pixel belongs and then converts the coordinates of the pixel into the coordinate system of the frustum. Shadowing effect can be obtained by comparison with a corresponding shadow map. The plant model has many interwoven leaves and branches so its shadow may have obvious aliasing and breakpoints. Thus, Gauss filtering is employed in the fragment shader. FIGS. 10(*a*) and 10(*b*) show results before and after 3*3 smooth filtering, respectively. FIG. 10(*c*) shows the result obtained after 5*5 smooth filtering. In the Gauss filtering, the shadow contribution value sf of each point is a Gauss convolution of the shadow depth value in the shadow map. Two different Gauss smooth filtering are designed to achieve different anti-aliasing effect of the shadow. A k*k filter can be expressed as below $$sf[p] = 5^{-(k-3)} \Sigma 2^{-(\|\Delta\|_1 + 2(4-k))} stex[p + \Delta] \qquad (2),$$

where, $$\Delta \in \left\{ (x, y)^t \mid x, y = -\frac{k-1}{2}, -\frac{k-1}{2} + 1 \ldots, \frac{k-1}{2} \right\}.$$

k is a positive odd number, $\|\Delta\|_1$ is the Euclidean norm of a vector $\Delta(i=1, 2)$. p represents the normalized device coordinates of a fragment in the coordinate system of the screen obtained by rasterizing a primitive, and stex[x] indicates whether a point x is in the shadow. If the point x is in the shadow, stex[x] returns a value 0, otherwise stex[x] returns a value 1. The value range of sf is between 0.0 and 1.0 and sf is used for illumination calculation of fragment in and not in the shadow.

Illumination calculation in the scene is based on a simple illumination model (Phong illumination model). The illumination comprises diffused light, specular light, and ambient light.

Shadows are added to Phong shading method, wherein for each fragment:
1) calculating ambient light: Ia;
2) calculating diffused light: Id;
3) calculating specular light: Is;
4) calculating shadowing factor: f;
5) calculating pixel's RGB value: I=Ia+(Kd*Id+Ks*Is)*f,
where Kd and Ks are the material's reflection factors for diffused light and specular light respectively.

For different frustum partitions, the shadow maps are updated with different frequencies. For the frustum partition closest to the viewpoint, the shadow maps are updated on a frame-by-frame basis. The updating frequency decreases for frustums distance from the viewpoint. The shadow maps have a relatively large size for the frustums close to the viewpoint and a relatively small size for the frustums distant from the viewpoint. For example, for the frustum close to the viewpoint, the shadow map may have a large size, e.g., 4096*4096 pixels to achieve accurate shadow information, while for the frustum distant from the viewpoint the shadow map may have a small size, e.g., 512*512 pixels. Multiple Render Targets technology is employed for each frustum partition to generate the shadow map for each frustum simultaneously.

FIG. 4 illustrates real-time shadow rendering and interactive operation performed off-line after the data is acquired on line.

6. Results and Conclusions

The method according to the present invention can be implemented by C++ language on a PC with an Intel Core i7 2.66 GHz CPU, 2 GB RAM and an NVIDIA GeForce GTX460 graphic card. The PC is equipped with Windows XP operating system and OpenGL 2.0 graphic function library.

Figure 12:
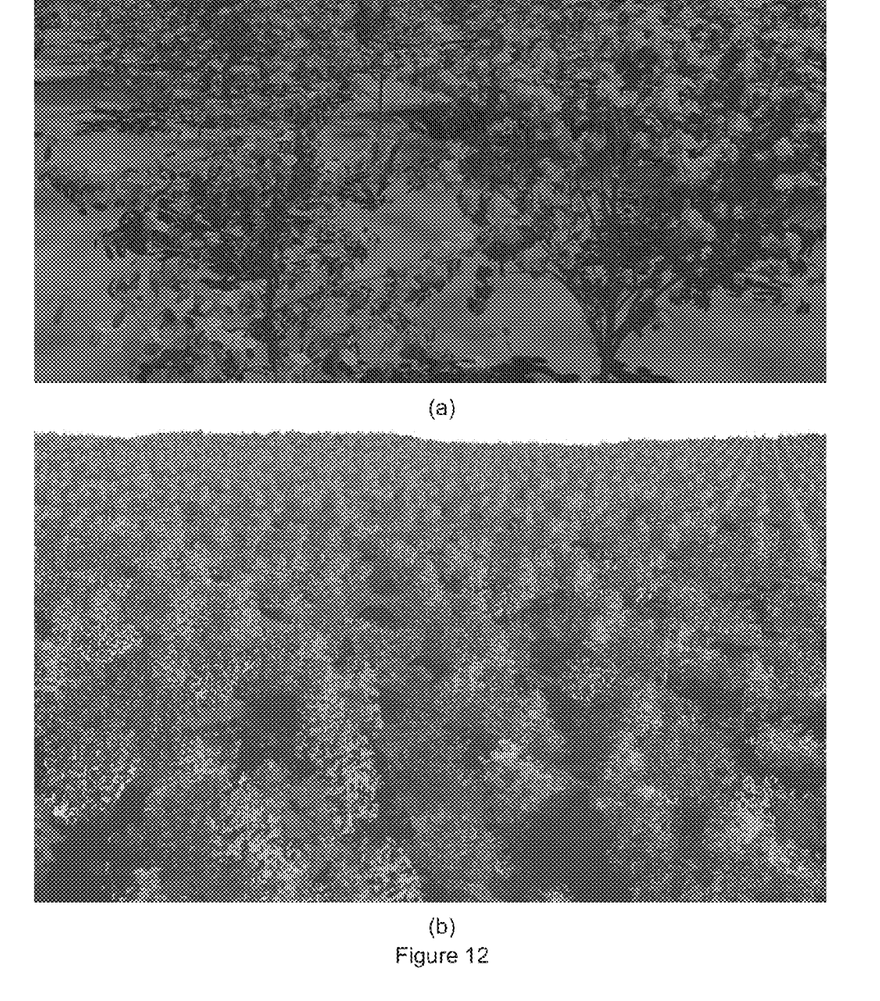
FIG. 12 illustrates a pedestrian view and a bird's eye view of the scene according to the present invention.

For each tree model, a sequence of multi-resolution models is generated. Each sequence comprises four models with different resolutions. FIG. 12(*a*) illustrates a complex scene comprising 43350 plant models. The user can roam in the scene in a bird's eye manner. The rendering window has a resolution of 1920*1150 pixels. FIG. 12(*b*) illustrates a complex scene comprising 43350 plant models. The user can roam in the scene in a bird's eye manner. The rendering window has a resolution of 1920*1150 pixels. The method according to the present invention can implement real-time and realistic rendering of large-scale scene.

Table 1 shows some of the experimental data, comprising the number of frames rendered per second, the number of models in the frustum of viewpoint, the LOD control distance, the number of multi-resolution models for each level, and the total number of polygons in the frustum. The number of multi-resolution models for each level is the number of multi-resolution models displayed in the frustum for the current viewpoint. For example, the numbers of the multi-resolution models for respective levels are 24, 32, 175, and 202, respectively. There are 24 tree models with the highest complexity within 899 centimeters from the viewpoint. There are 175 tree models with the tertiary-highest complexity in a range of 2862-14201 centimeters from the viewpoint. There are 202 tree models with the fourthly-highest complexity beyond 14202 centimeters from the viewpoint.

TABLE 1

Experimental Data

| | FIG. 12 (a) | FIG. 12 (b) |
|---|---|---|
| FPS | 23.91 | 11.85 |
| Number of Models in the Frustum | 433 | 8667 |
| LOD distances | 899; 2861; 14201 | 205; 529; 1991 |
| Models in Each LOD Level | 24; 32; 175; 202 | 98; 121; 156; 8292 |
| Number of Polygons in the Frustum | 1075622 | 21737965 |

The foregoing description is only directed to specific embodiments of the present invention. The scope of the present invention is not limited thereto. Any changes or replacements that are obvious to one of ordinary skill in the art in light of the present invention will fall within the scope thereof. The scope of the present invention is therefore defined by the attached claims.

The invention claimed is:

1. A method for realistic and real-time rendering of complex scene in internet environment, comprising:
   a) generating sequences of scene-object-multi-resolution models, a scene configuration file, a texture and material file, and a scene data list file;
   b) compressing the sequences of scene-object-multi-resolution models, the scene configuration file, the textures and material files, and the scene data list file and uploading the compressed files to a server;
   c) downloading, at a client terminal, the scene-object-multi-resolution models, the scene configuration file, the texture and material file, and the scene data list file in ascending order of resolution and rendering the scene simultaneously;

d) dividing, in rendering the scene, a frustum in parallel into a plurality of partitions, generating a shadow map for each frustum, filtering the shadow maps to obtain an anti-aliasing shadowing effect; and e) the shadow map closest to a viewpoint is updated on a frame-by-frame basis and updating frequency decreases for the shadow maps distant from the viewpoint, wherein the shadow map closest to the viewpoint has the largest size, and the size of the shadow map decreases for the shadow maps distant from the viewpoint.

2. The method according to claim 1, wherein the scene-object-multi-resolution model is generated by:

replacing two polygons, all vertexes of which constitute a set $\psi$, with a tetrahedron, wherein four vertexes of the tetrahedron are determined as follows: selecting two endpoints of a diameter of $\psi$ as a first vertex and a second vertex; selecting a point in $\psi$ that has a largest sum of distances from the first vertex and the second vertex as the third vertex; and selecting a point in $\psi$ that has a largest sum of distances from the first vertex, the second vertex, and the third vertex as the fourth vertex; and repeating the replacing procedure to generate the scene-object-multi-resolution model.

3. The method according to claim 1, wherein the multi-resolution models include high-resolution models and low-resolution models, wherein the model's resolution is determined by a number of polygons contained therein.

4. The method according to claim 3, wherein the number of the polygons contained in the model depends from a distance from the model to the viewpoint.

5. The method according to claim 1, wherein the scene configuration file include property information of the object.

6. The method according to claim 5, wherein the object includes tree, building, and terrain.

7. The method according to claim 5, wherein the property information includes the object's name, position, rotational angle, tilting angle, size, and scaling size, and file name of geometric model data.

8. The method according to claim 1, wherein the texture and material file includes ambient light information, diffused light information, specular light information, and the texture image of the models.

9. The method according to claim 1, wherein the scene data list file lists as the scene data list file respective file names of the sequences of scene-object-multi-resolution models, the scene configuration file, the textures and material files, and the scene data list file and uploading the compressed files to a server and corresponding catalog information.

10. The method according to claim 9, wherein the scene data list file lists the scene configuration file, the textures and material files, and the sequences of scene-object-multi-resolution models in sequence.

11. The method according to claim 10, wherein the sequences of scene-object-multi-resolution models are arranged in ascending order or resolution.

12. The method according to claim 1, wherein the scene is rendered simultaneously with the downloading of data, wherein the low-resolution models are replaced with the high-resolution models progressively so that the models of the objects close to a viewpoint contain sufficient details.

13. The method according to claim 1, wherein the dividing comprises dividing the frustum into the plurality of partitions in parallel to a distant cross section perpendicular to sight line to increase a resolution of shadow map close to a viewpoint.

14. The method according to claim 1, wherein only the models in a current frustum of light source are rendered while the models outside the frustum of light source are culled.

15. The method according to claim 14, wherein culling the models comprises:

calculating a boundary box comprising eight vertexes for each model;

calculating, for each vertexes, coordinates and a distance to a viewpoint in a coordinate system of a viewport of a current screen; and culling the model if it is not close to the viewpoint and projections of its eight vertexes in the coordinate system of the viewport of the screen are outside the viewport of the screen.

16. The method according to claim 1, wherein the shadow map is smoothed using a Gauss filter in the frame buffer of the client terminal.

17. The method according to claim 16, wherein Gauss filtering is performed according to:

$$sf[p] = 5^{-(k-3)} \Sigma 2^{-(\|\Delta\|_1 + 2(4-k))} stex[p + \Delta]$$

where, $$\Delta \in \left\{ (x, y)^t \mid x, y = -\frac{k-1}{2}, -\frac{k-1}{2}+1 \ldots, \frac{k-1}{2} \right\},$$

k is a positive odd number, $\|\Delta\|_1$ is a Euclidean norm of a vector $\Delta$ (i=1, 2), p represents coordinates of a fragment in the coordinate system of the screen obtained by rasterizing a primitive, and stex[x] indicates whether a point x is in the shadow, wherein if the point x is in the shadow, stex[x] returns a value 0, otherwise stex[x] returns a value 1, the value range of sf is between 0.0 and 1.0 and sf is used for illumination calculation of fragment within and outside the shadow.

18. The method according to claim 1, wherein in rendering the scene in the client terminal, depth value of each rasterized fragment is compared in parallel with that of a corresponding pixel of the filtered shadow map to generate shadowing effect.

* * * * *